United States Patent
Forsyth

(10) Patent No.: US 8,956,259 B2
(45) Date of Patent: Feb. 17, 2015

(54) SELECTABLE GROUNDED GEAR LINEAR ACTUATION

(75) Inventor: John R. Forsyth, Milford, MI (US)

(73) Assignee: Magna Powertrain, Inc., Concord, Ontario (CA)

( * ) Notice: Subject to any disclaimer, the term of this patent is extended or adjusted under 35 U.S.C. 154(b) by 0 days.

(21) Appl. No.: 14/000,956

(22) PCT Filed: Dec. 14, 2011

(86) PCT No.: PCT/US2011/064841
§ 371 (c)(1),
(2), (4) Date: Jan. 30, 2014

(87) PCT Pub. No.: WO2012/121770
PCT Pub. Date: Sep. 13, 2012

(65) Prior Publication Data
US 2014/0141923 A1 May 22, 2014

Related U.S. Application Data

(60) Provisional application No. 61/450,843, filed on Mar. 9, 2011.

(51) Int. Cl.
*F16H 3/44* (2006.01)
*F16H 3/46* (2006.01)
*B60K 17/344* (2006.01)
*B60K 23/08* (2006.01)

(52) U.S. Cl.
CPC .............. *F16H 3/46* (2013.01); *B60K 17/344* (2013.01); *B60K 23/08* (2013.01); *B60K 2023/0875* (2013.01)
USPC ........................................................ 475/282

(58) Field of Classification Search
None
See application file for complete search history.

(56) References Cited

U.S. PATENT DOCUMENTS

2013/0345015 A1* 12/2013 Larkin et al. .................. 475/295

* cited by examiner

*Primary Examiner* — Dirk Wright
(74) *Attorney, Agent, or Firm* — Dickinson Wright PLLC

(57) ABSTRACT

A power transfer mechanism includes a shift mechanism translating a shift sleeve to a first position where an input shaft is directly drivingly coupled to a first output shaft and to a second position where a reduced speed drive ratio connection exists between the input shaft and the first output shaft as well as the input shaft and a second output shaft via a first planetary gearset. The shift system includes a second planetary gearset having a planet gear fixed for rotation with a lead screw threadingly engaged with the shift sleeve. Rotation of the planet gear axially translates the shift sleeve. A first clamp arm restricts rotation of one member of the second planetary gearset to cause rotation of the planet gear in a first direction. A second clamp arm restricts rotation of another member of the planetary gearset to rotate the planet gear in an opposite direction.

17 Claims, 5 Drawing Sheets

SELECTABLE GROUNDED GEAR LINEAR ACTUATION

FIELD

The present disclosure relates generally to a power transfer mechanism used in a four-wheel drive vehicle. More particularly, a shift mechanism includes a linear actuator driven by a planetary gearset equipped with selective grounded members.

BACKGROUND

Demand continues to increase for four-wheel drive vehicles based on the enhanced on-road and off-road traction control they provide. In many four-wheel drive vehicles, a transfer case is installed in the drivetrain and is normally operable to deliver drive torque to a primary driveline for establishing a two-wheel drive mode. The transfer case may be further equipped with a clutch assembly that can be selectively or automatically actuated to transfer drive torque to the secondary driveline for establishing a four-wheel drive mode. These "mode" clutch assemblies may include a simple dog clutch that is operable for mechanically shifting between the two-wheel drive mode and a "locked" (i.e., part-time) four-wheel drive mode, a sophisticated automatically-actuated multi-plate clutch for providing an "on-demand" four-wheel drive mode, or some other variant.

On-demand four-wheel drive systems are able to provide enhanced traction and stability control and improved operator convenience since the drive torque is transferred to the secondary driveline automatically. An example of a passively-controlled on-demand transfer case is shown in U.S. Pat. No. 5,704,863 where the amount of drive torque transferred through a pump-actuated clutch pack is regulated as a function of the interaxle speed differential. In contrast, actively-controlled on-demand transfer cases include a clutch actuator that is adaptively controlled by an electronic control unit in response to instantaneous vehicular operating characteristics detected by a plurality of vehicle sensors. U.S. Pat. Nos. 4,874,056, 5,363,938 and 5,407,024 disclose various examples of adaptive on-demand four-wheel drive systems.

Due to the cost and complexity associated with such actively-controlled, on-demand clutch control systems, recent efforts have been directed to constructing simplified transfer cases that provide dedicated operating modes without incorporating multiple friction plate clutches and the associated actuators. It may be beneficial to continue to develop transfer cases that do not require large electric actuator motors or hydraulic pumps but instead take advantage of the kinetic energy of the vehicle to complete a shift. In addition, it may be desirable to disconnect various power transfer components from the load path during certain modes of operation to increase the fuel efficiency of the vehicle.

SUMMARY

This section provides a general summary of the disclosure, and is not a comprehensive disclosure of its full scope or all of its features.

A power transfer mechanism includes an input shaft and first and second output shafts. A shift mechanism translates a shift sleeve to a first position where the input shaft is drivingly coupled to the first output shaft in a direct drive ratio connection and to a second position where a reduced speed drive ratio connection exists between the input shaft and the first output shaft as well as the input shaft and the second output shaft via a first planetary gearset. The shift system includes a second planetary gearset having a planet gear fixed for rotation with a lead screw threadingly engaged with the shift sleeve. Rotation of the planet gear axially translates the shift sleeve. The shift system includes a first clamp arm to restrict rotation of one member of the second planetary gearset to cause rotation of the planet gear in a first direction. A second clamp arm restricts rotation of another member of the planetary gearset to rotate the planet gear in an opposite direction.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
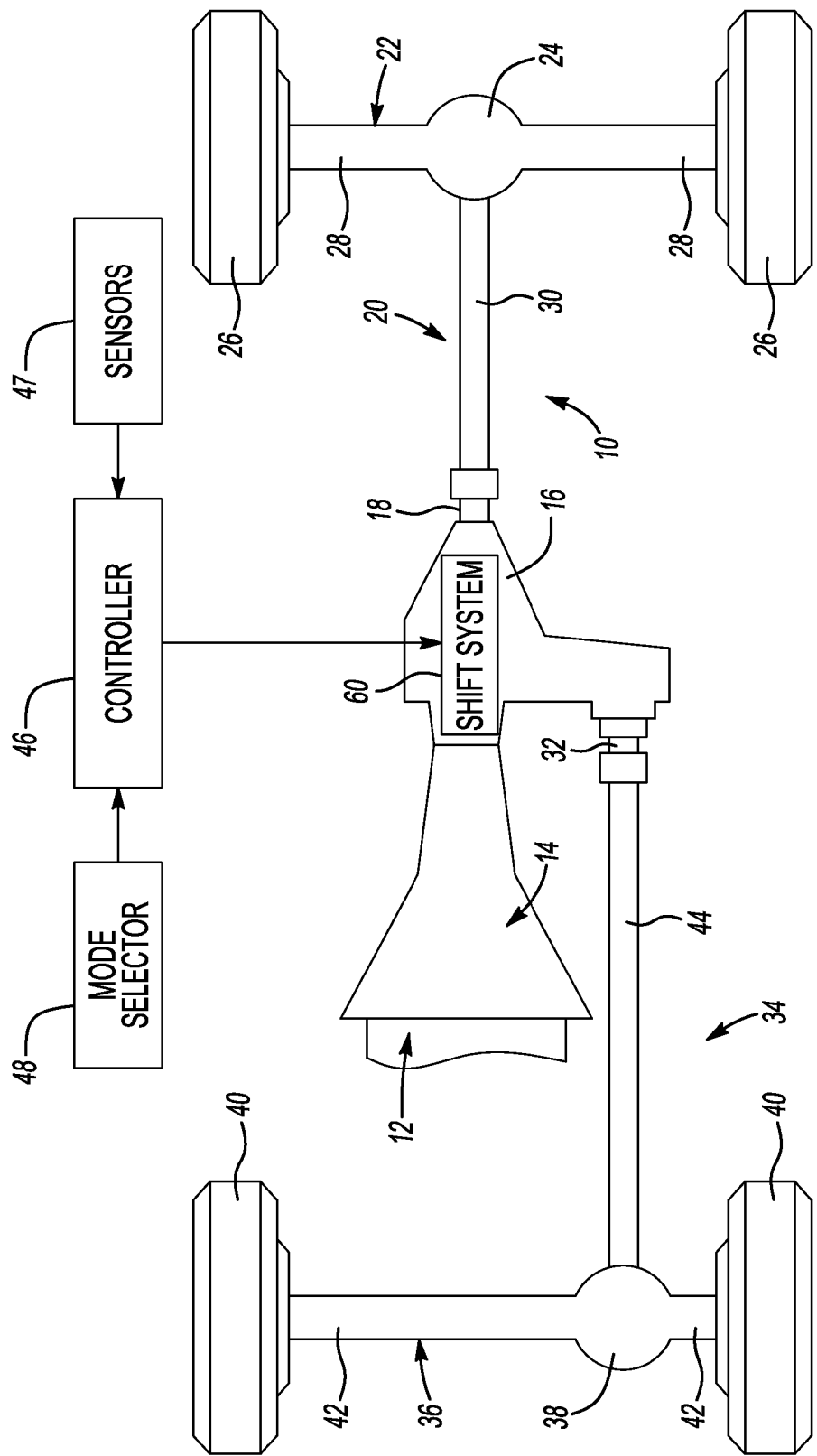
FIG. 1 is a schematic view of an exemplary vehicle equipped with the selectable grounded gear linear actuation system of the present disclosure.

Referring now to FIG. 1, a drive system 10 for a four-wheel drive motor vehicle is shown to include a power source, such as an engine 12, which drives a conventional transmission 14 of either the manually-shifted or automatic type. The output shaft of transmission 14 drives an input member of a transfer case 16 which, in turn, delivers drive torque to a primary output shaft 18 that is operably connected to a primary driveline 20. Primary driveline 20 includes an axle assembly 22 having a differential 24 driving a pair of wheel assemblies 26 via axleshafts 28, and a drive shaft 30 connected between primary output shaft 18 and differential 24.

Transfer case 16 further includes a secondary output shaft 32 that is operably connected to a secondary driveline 34. Secondary driveline 34 includes an axle assembly 36 having a differential 38 driving a pair of wheel assemblies 40 via axleshafts 42, and a driveshaft 44 connected between secondary output shaft 32 and differential 38.

Drive system 10 also includes an electronic controller 46 which receives input data from various vehicle sensors 47 and a mode selector 48. Controller 46 uses the input data from sensors 47 and mode selector 48 to generate control signals used to actuate one or more controllable systems associated with transfer case 16. According to the arrangement shown, primary driveline 20 is the rear driveline of a rear wheel drive vehicle while secondary driveline 34 is its front driveline. Drive torque is typically supplied to rear driveline 20 and is only transferred to front driveline 34 when mode selector 48 signals operation in one of a four-wheel drive or a four-wheel lock mode. However, it will be understood that the teachings of the present disclosure could easily be adapted for use in a front wheel drive vehicle in which the front driveline would be designated as the primary driveline.

Figure 2:
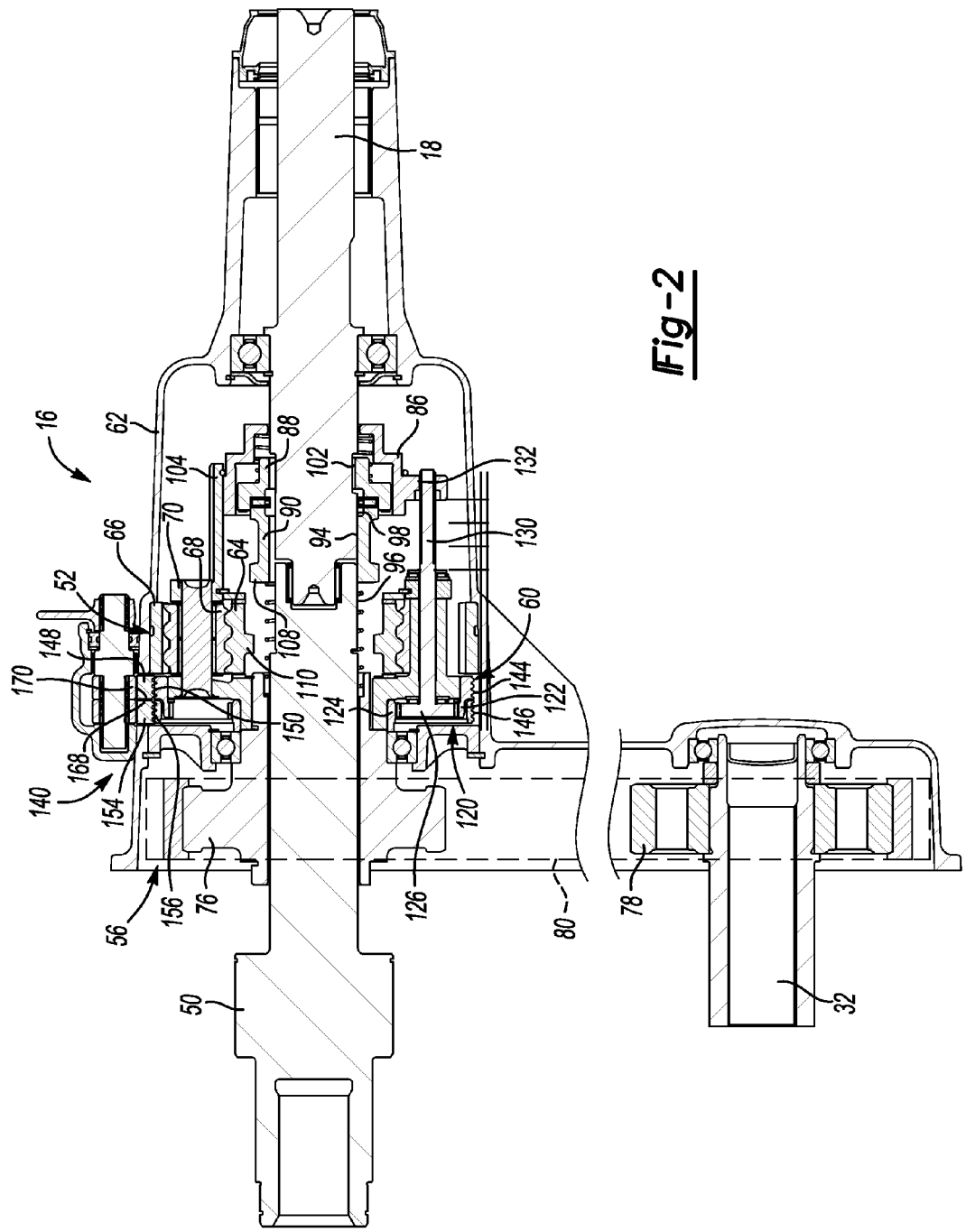
FIG. 2 is a fragmentary sectional view of a transfer case including a linear actuation shift system.

Referring primarily to FIG. 2, transfer case 16 is shown to generally include an input shaft 50, rear output shaft 18, a planetary reduction gearset 52, a front output shaft 32, a transfer assembly 56, and a shift system 60, all of which are mounted with a housing assembly 62. Input shaft 50 is adapted for connection to the output shaft of transmission 14. Planetary gearset 52 includes a sun gear 64, a ring gear 66 non-rotatably fixed to housing assembly 62, and a plurality of planet gears 68 rotatably supported on a planet carrier 70.

Transfer assembly 56 includes a drive sprocket 76 fixed for rotation with planet carrier 70. A driven sprocket 78 is fixed for rotation with front output shaft 32. A flexible drive member such as a chain 80 drivingly interconnects drive sprocket 76 and driven sprocket 78.

Shift system 60 includes a first sleeve 86, a second sleeve 88 and a third sleeve 90 axially translatable between a high-range (H) position, a high lock (HL) position, a neutral (N) position, and a low-range (L) position. In the H position, clutch teeth 94 on third sleeve 90 engage clutch teeth 96 on input shaft 50 and clutch teeth 98 of rear output shaft 18 to establish a direct ratio drive connection between input shaft 50 and rear output shaft 18. When shift system 60 operates in the H mode, torque is not transferred to front output shaft 32.

To provide the HL mode, each of first, second and third range sleeves 86, 88 and 90 are translated to new positions. In particular, third sleeve 90 remains drivingly engaged with input shaft 50 and rear output shaft 18. Second sleeve 88 includes a plurality of clutch teeth 102 engaged with clutch teeth 98 of rear output shaft 18. Second sleeve 88 is fixed for rotation with third sleeve 90 via rear output shaft clutch teeth 98 but remains axially moveable relative thereto. Second sleeve 88 is also in a splined connection to first sleeve 86. Planet carrier 70 includes lugs 104 axially extending toward rear output shaft 18 that are fixed for rotation with first sleeve 86. In the high lock (HL) mode of operation, input shaft 50, rear output shaft 18, planet carrier 70 and drive sprocket 76 rotate at the same speed. Front output shaft 32 is also continuously driven based on the drive connection between chain 80 and driven sprocket 78.

In the N position, third sleeve 90 is disengaged from rear output shaft 18. Torque is not transferred from input shaft 50 to either rear output shaft 18 or front output shaft 32. In the L position, a set of clutch teeth 108 formed on third sleeve 90 meshingly engage clutch teeth 110 formed on sun gear 64. Reduced speed output from planetary gearset 52 is provided to drive sprocket 76 via planet carrier 70 as well as rear output shaft 18 via lugs 104, first sleeve 86 and second sleeve 88.

Shift system 60 includes a planetary gearset 120 including a ring gear 122, a sun gear 124 and a pinion gear 126. Pinion gear 126 is rotatably supported within planet carrier 70. A drive screw 130 is integrally formed with and fixed for rotation to pinion gear 126. Drive screw 130 is threadingly engaged with first sleeve 86 at a threaded aperture 132. Rotation of drive screw 130 axially translates first sleeve 86. Drive screw 130 may be rotated in either direction to axially translate first sleeve 86 in either direction.

Shift system 60 also includes a grounding mechanism 140 for selectively restricting rotation of ring gear 122 or sun gear 124. When ring gear 122 is restricted from rotation, pinion gear 126 rotates in a first direction to translate first sleeve 86 in a first direction. When ring gear 122 is free to rotate and sun gear 124 is restricted from rotation, pinion gear 126 rotates in the opposite direction. First sleeve 86 translates in an opposite direction.

A first brake drum 144 is fixed for rotation with ring gear 122. A second brake drum 146 is fixed for rotation with sun gear 124. A first clamp arm 148 includes a first friction surface 150 for selective engagement with first brake drum 144. In similar fashion, a second clamp arm 154 includes a second friction surface 156 selectively engageable with second brake drum 146. First clamp arm 148 and second clamp arm 154 are biased toward a position where friction surfaces 150 and 156 are clear of brake drums 144, 146. A biasing member such as spring 160 may be associated with first clamp arm 148 and second clamp arm 154. More than one spring may provide the desired function.

Figure 3:
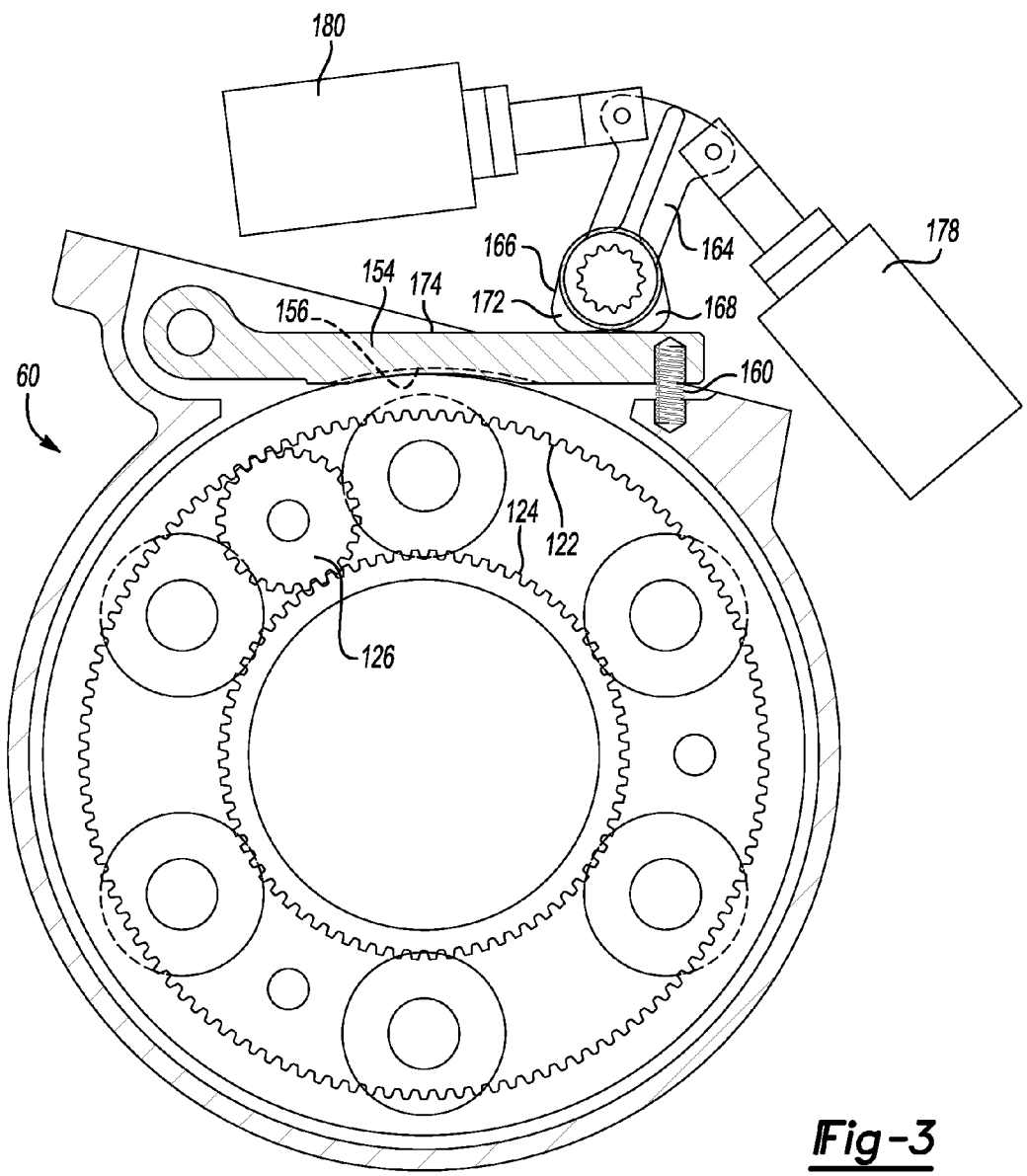
FIG. 3 is a fragmentary view depicting a portion of the shift system shown in FIG. 2.

An actuation arm 164 is fixed for rotation with a dual lobe cam 166. A first cam lobe 168 engages a surface 170 of first clamp arm 148. A second cam lobe 172 is axially offset from first cam lobe 168 and is positioned in contact with a surface 174 of second clamp arm 154. First cam lobe 168 and second cam lobe 172 are circumferentially clocked at different positions such that rotation of actuation arm 164 in a clockwise direction when viewed in FIG. 3 engages first cam lobe 168 with first clamp arm 148 but not second cam lobe 172 with second clamp arm 154. Rotation of actuation arm 164 in the clockwise direction causes first cam lobe 168 to drive first clamp arm 148 in a downward direction to engage first friction surface 150 with first brake drum 144. Second cam lobe 172 does not cause second clamp arm 154 to move during clockwise rotation of actuation arm 164. Conversely, rotation of actuation arm 164 in a counter-clockwise direction causes second cam lobe 172 to drive second clamp arm 154 downwardly and engage second friction surface 156 with second brake drum 146. First cam lobe 168 does not drive first clamp arm 148 into contact with first brake drum 144 when actuation arm 164 rotates in the counter-clockwise direction.

A first solenoid 178 is drivingly coupled to actuation arm 164 to urge the actuation arm in one of a clockwise or counter-clockwise direction. A second solenoid 180 is drivingly coupled to actuation arm 164 to urge actuation arm 164 in the other of the clockwise or counter-clockwise directions. Controller 46 is operable to selectively energize either first solenoid 178 or second solenoid 180 to rotate actuation arm 164 in one of the clockwise or counter-clockwise direction. Depending on the rotation induced, ring gear 122 or sun gear 124 will be restricted from rotation. During vehicle movement, members of planetary gearset 120 are driven causing pinion gear 126 and drive screw 130 to rotate thereby translating first sleeve 86.

Figure 4:
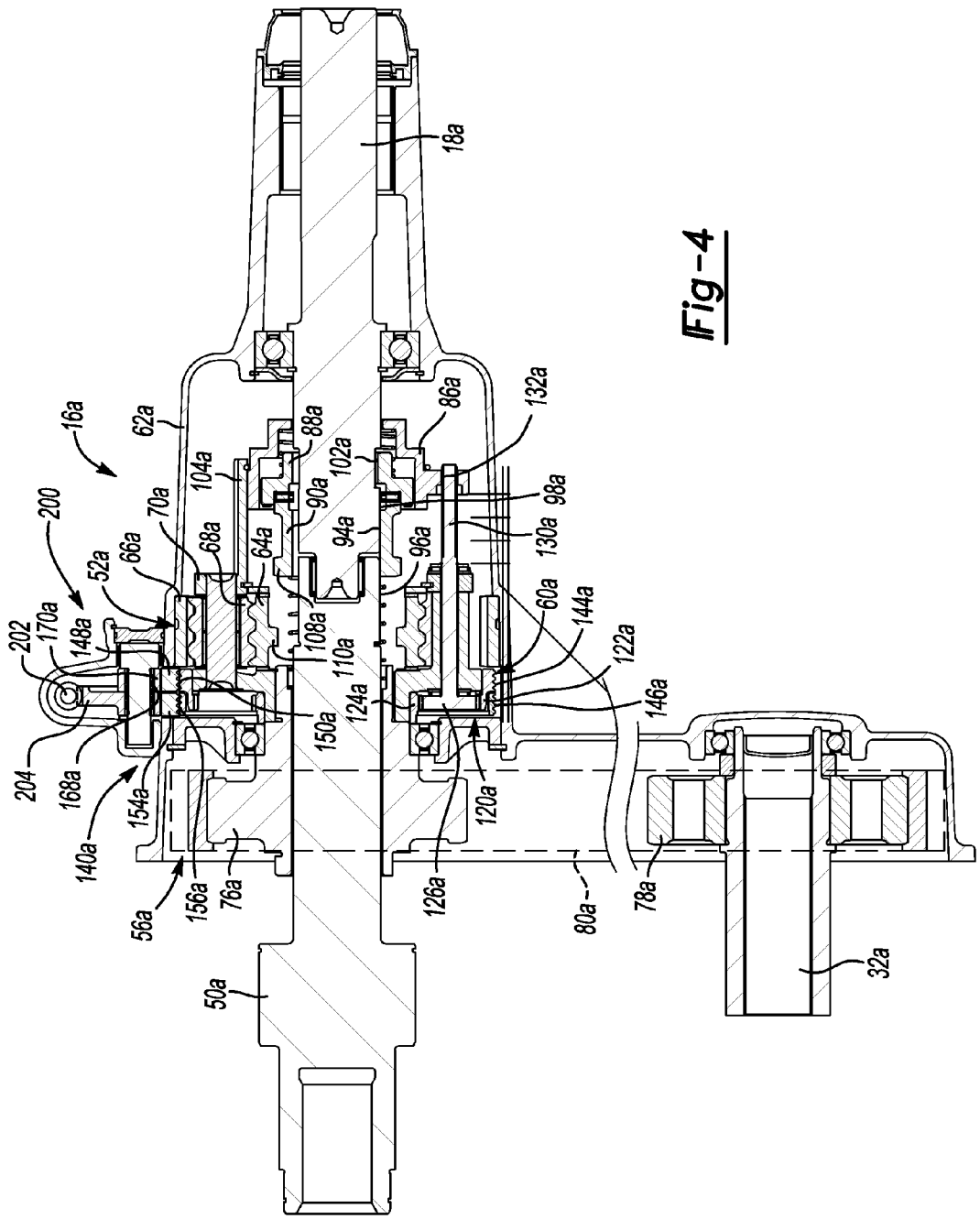
FIG. 4 is a fragmentary cross-sectional view of a transfer case equipped with an alternate shift system.
Figure 5:
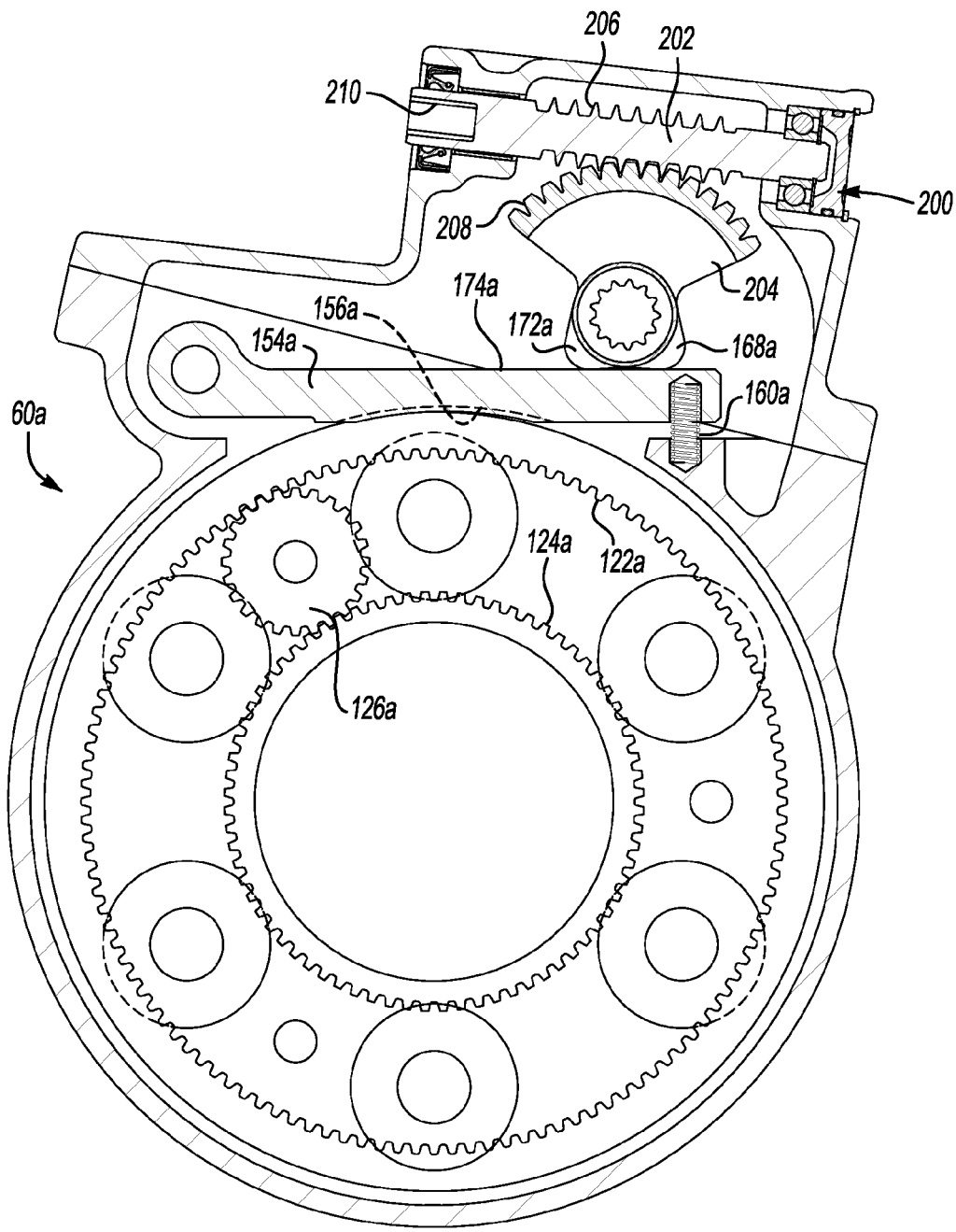
FIG. 5 is a fragmentary sectional view of the shift system shown in FIG. 4.

FIGS. 4 and 5 depict an alternate shift system 60a. Shift system 60a is substantially similar to shift system 60. As such, similar elements will be identified with like reference numerals including an "a" suffix. Shift system 60a incorporates a worm gear assembly 200 including a worm shaft 202 and a sector gear 204 in lieu of solenoids 178, 180. Worm shaft 202 includes gear teeth 206 meshingly engaged with gear teeth 208 of sector gear 204. Sector gear 204 is fixed to a first cam lobe 168a and a second cam lobe 172a. An electric motor (not shown) may be drivingly coupled to worm shaft 202 via a socket 210. The electric motor may be controlled to rotate in a clockwise or a counter-clockwise direction to rotate sector gear 204 in either a clockwise or counter-clockwise direction. The remaining operation of shift system 60a is substantially similar to shift system 60.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A power transfer mechanism comprising:
an input shaft;
first and second output shafts;
a first planetary gearset including a sun gear, a ring gear, a carrier and a pinion gear meshingly engaged with the sun and ring gears; and
a shift mechanism for translating a shift sleeve to a first position where the input shaft is drivingly coupled to the first output shaft in a direct drive ratio connection and to a second position where a reduced speed drive ratio connection exists between the input shaft and the first output shaft as well as the input shaft and the second output shaft via the first planetary gearset, the shift system including a second planetary gearset having a planet gear fixed for rotation with a lead screw threadingly engaged with the shift sleeve, wherein rotation of the planet gear axially translates the shift sleeve, the shift system including a first clamp arm operable to restrict rotation of one member of the second planetary gearset to cause the planet gear to rotate in a first direction and a second clamp arm operable to restrict rotation of another member of the planetary gearset to cause the planet gear to rotate in an opposite direction.

2. The power transfer mechanism of claim 1, wherein the second planetary gearset includes a ring gear and a sun gear meshed with the planet gear, the power transfer mechanism further including a first brake drum fixed for rotation with the sun gear and a second brake drum fixed for rotation with the ring gear, the first and second clamp arms each including a friction surface engageable with one of the first and second brake drums.

3. The power transfer mechanism of claim 2, further including a cam including a first cam lobe drivingly engaged with the first clamp arm and a second cam lobe drivingly engaged with the second clamp arm.

4. The power transfer mechanism of claim 3, wherein rotation of the cam in a first direction causes the first clamp arm to brake the one member of the second planetary gearset.

5. The power transfer mechanism of claim 4, wherein rotation of the cam in a second opposite direction causes the second clamp arm to brake the another member of the second planetary gearset.

6. The power transfer mechanism of claim 5, further including an actuator for rotating the cam, the actuator including first and second solenoids coupled to a lever, the lever being fixed to the cam.

7. The power transfer mechanism of claim 5, further including an actuator for rotating the cam, the actuator including a worm shaft and a sector gear.

8. The power transfer mechanism of claim 1, wherein the lead screw passes through the carrier of the first planetary gearset.

9. The power transfer mechanism of claim 1, wherein the carrier of the first planetary gearset is the carrier of the second planetary gearset.

10. The power transfer mechanism of claim 9, wherein the input shaft, the first output shaft and the carrier rotate about a common axis.

11. The power transfer mechanism of claim 10, further including a drive sprocket, a driven sprocket and a flexible drive member drivingly interconnecting the sprockets, the flexible drive member being operable to transfer torque between the input shafts and the second output shaft.

12. A power transfer mechanism comprising:
an input shaft;
an output shaft;
a first planetary gearset including a sun gear, a ring gear, a carrier and a pinion gear meshingly engaged with the sun and ring gears;
a shift mechanism for translating a shift sleeve to a first position where the input shaft is drivingly coupled to the output shaft in a direct drive ratio connection and to a second position where a reduced speed drive ratio connection exists between the input shaft and the output shaft via the first planetary gearset, the shift system including a second planetary gearset having a planet gear fixed for rotation with a lead screw threadingly engaged with the shift sleeve, wherein rotation of the planet gear axially translates the shift sleeve, the shift system including a first clamp arm operable to restrict rotation of one member of the second planetary gearset to cause the planet gear to rotate in a first direction and a second clamp arm operable to restrict rotation of another member of the planetary gearset to cause the planet gear to rotate in an opposite direction.

13. The power transfer mechanism of claim 1, wherein the second planetary gearset includes a ring gear and a sun gear meshed with the planet gear, the power mechanism further including a first brake drum fixed for rotation with the sun gear and a second brake drum fixed for rotation with the ring gear, the first and second clamp arms each including a friction surface engageable with one of the first and second brake drums.

14. The power transfer mechanism of claim 13, further including a cam including a first cam lobe drivingly engaged with the first clamp arm and a second cam lobe drivingly engaged with the second clamp arm, wherein rotation of the cam in a first direction causes the first clamp arm to brake the one member of the second planetary gearset, and rotation of the cam in a second opposite direction causes the second clamp arm to brake the another member of the second planetary gearset.

15. The power transfer mechanism of claim 14, further including an actuator for rotating the cam, the actuator including first and second solenoids coupled to a lever, the lever being fixed to the cam.

16. The power transfer mechanism of claim 14, further including an actuator for rotating the cam, the actuator including a worm shaft and a sector gear.

17. The power transfer mechanism of claim 1, wherein the lead screw passes through the carrier of the first planetary gearset.

* * * * *